United States Patent
Ogawa et al.

(10) Patent No.: US 9,853,887 B2
(45) Date of Patent: Dec. 26, 2017

(54) INFORMATION TRANSFER DEVICE, DELAY TOLERANT NETWORK, INFORMATION TRANSMISSION METHOD, AND RECORDING MEDIUM

(71) Applicants: NEC Corporation, Tokyo (JP); TOHOKU UNIVERSITY, Miyagi (JP)

(72) Inventors: Masatsugu Ogawa, Tokyo (JP); Hisaya Wakayama, Tokyo (JP); Yuma Matsuda, Tokyo (JP); Junpei Kamimura, Tokyo (JP); Masafumi Yano, Miyagi (JP)

(73) Assignees: NEC CORPORATION, Tokyo (JP); TOHOKU UNIVERSITY, Miyagi (JP)

( * ) Notice: Subject to any disclaimer, the term of this patent is extended or adjusted under 35 U.S.C. 154(b) by 129 days.

(21) Appl. No.: 14/774,340

(22) PCT Filed: Mar. 12, 2014

(86) PCT No.: PCT/JP2014/057628
§ 371 (c)(1),
(2) Date: Sep. 10, 2015

(87) PCT Pub. No.: WO2014/142344
PCT Pub. Date: Sep. 18, 2014

(65) Prior Publication Data
US 2016/0020996 A1    Jan. 21, 2016

(30) Foreign Application Priority Data

Mar. 13, 2013   (JP) ................................. 2013-050770

(51) Int. Cl.
*G01R 31/08* (2006.01)
*H04L 12/721* (2013.01)
(Continued)

(52) U.S. Cl.
CPC ........... *H04L 45/26* (2013.01); *H04W 40/246* (2013.01); *H04W 40/248* (2013.01); *H04W 84/18* (2013.01)

(58) Field of Classification Search
CPC ...................................................... H04L 45/26
See application file for complete search history.

(56) References Cited

U.S. PATENT DOCUMENTS

2008/0298251 A1* 12/2008 Khuu .................... H04L 45/125
                                                                  370/238
2010/0194558 A1*  8/2010 Toh ......................... G08G 1/162
                                                                  340/539.1
(Continued)

FOREIGN PATENT DOCUMENTS

JP     2006-186446    7/2006
JP     2012-119926    6/2012

OTHER PUBLICATIONS

International Search Report, PCT/JP2014/057628, dated Jun. 17, 2014.
(Continued)

*Primary Examiner* — Gerald Smarth
(74) *Attorney, Agent, or Firm* — Young & Thompson

(57) ABSTRACT

A delay tolerant network is built with the use of a plurality of information transfer devices each of which includes: a communication unit to communicate to and from another device within a communication range that is connected to the information transfer device; and a storing unit to store and keeps collected notification information, and each of which holds delay tolerant communication by exchanging the collected and kept notification information with another device when the exchange becomes possible. Each information transfer device includes a control unit to exchange environment information with another information transfer device, and to execute deriving processing an assigned range (Continued)

that is assigned autonomously to its own information transfer device, based on the environment information that is kept by its own information transfer device, through a planarization search processing in which a value is evened out between its own information transfer device and other information transfer devices.

30 Claims, 9 Drawing Sheets

(51) Int. Cl.
*H04W 84/18* (2009.01)
*H04W 40/24* (2009.01)

(56) References Cited

U.S. PATENT DOCUMENTS

| | | | |
|---|---|---|---|
| 2010/0208662 A1* | 8/2010 | Fuste Vilella | H04W 40/00 370/328 |
| 2013/0070751 A1* | 3/2013 | Atwal | H04W 56/001 370/350 |
| 2014/0196025 A1* | 7/2014 | Corinella | H04W 4/001 717/178 |
| 2015/0173060 A1* | 6/2015 | Ge | H04W 72/048 370/252 |

OTHER PUBLICATIONS

K. Habibul Kabir et al., "Grouping clusters to minimize the total mean delivery delay of bundles in ferry-assisted DTNs", IEICE Technical Report. NS, Nerwork System, 111(408), Jan. 19, 2012 (Jan. 19, 2012), pp. 87 to 92.

K. Habibul Kabir et al., "Optimal Visiting Order of Isolated Clusters in DTNs to Minimize the Total Mean Delivery Delay of Bundles", Numerical Algebra, Control and Optimization vol. 1, No. 4, Dec. 2011, pp. 563-576.

Written Opinion, PCT/JP2014/057528, dated Jun. 17, 2014.

* cited by examiner

INFORMATION TRANSFER DEVICE, DELAY TOLERANT NETWORK, INFORMATION TRANSMISSION METHOD, AND RECORDING MEDIUM

TECHNICAL FIELD

This invention relates to a delay tolerant communication technology, and to a delay tolerant network for enabling information sharing efficiently via a movable information transfer device for notification information from information sources when the information sources can fail to establish a network connection to each other.

BACKGROUND ART

There is an information transmission method in which information terminals that fail to establish a network connection, to each other communicate, by temporarily storing an exchange notification information with each other in the information terminals, and sending the information when wireless communication to and from another information terminal becomes available. This method is commonly called delay tolerant networking (DTN), and the following notification information is called a bundle, a message, or the like. DTN is also an abbreviation of Disruption Tolerant Networking.

The concrete flow of information transmission is as follows in general. A given information terminal determines an arbitrary information terminal as the destination of notification information. But, the given information terminal recognizes that there are no other terminals with which the given information terminal can connect in its communication area at present. In this case, the given information terminal temporarily saves the notification information inside instead of transmitting. When other terminal with which the given information terminal can communicate subsequently enters the communication area, as a result of the moving of the given information terminal itself or the moving of the other terminal, the given information terminal establishes connection to the other terminal within the range of communication to send the temporarily saved notification information.

The information terminal that receives the notification information transmits the notification information, in the case where connection to other terminals with which the information terminal is communicable is established. And the information terminal temporarily saves the notification information inside instead of transmitting, in the case where there are no other communication terminals within its communication range. This operation is repeated by many terminals until the notification information reaches the arbitrary information terminal determined as the final destination. This information transmission method is dependent on chance and therefore not particularly efficient, but is an effective way of communication in a situation where a densely-connected network is not available.

Ad hoc networking is a communication technology similar to delay tolerant communication. The two resemble each other in that notification information is transmitted hop by hop between information terminals. On the other hand, ad hoc networking is a technology that is used only when a network path from a transmission end to a destination end is established (as terminal themselves or as the overall system), and does not transmit information by chance with a transmission route indeterminate at the time of initial transmission of the information as in delay tolerant communication. In other words, the transmission route in ad hoc networking is established as a wireless communication system at the time information is issued.

The premise of communication by ad hoc networking, which is called so because a wireless network is built dynamically, is nonetheless to build a network from the transmission end to the destination. Accordingly, ad hoc networking does not work in a situation where the connection path is indeterminate, such as one where information terminals are dispersed over a wide area. Delay tolerant communication is therefore important as means of information transmission under this condition.

Temporarily saving notification information to be transmitted and transmitting the saved information once communication becomes possible is the basic mode of delay tolerant communication. The feature of temporarily saving notification information to be transmitted and then communicating the saved information to another information terminal can be applied to obtain an information transmission method described below. This information transmission method is sometimes called store-and-forward transfer or ferry transfer.

When there are several stationary information sources (or information source groups) among which communication is not established, information terminals having a delay tolerant communication function (DTN terminals) are prepared and circuited around the information sources on set paths. The information terminals approach each the information source to obtain and keep notification information from the information sources, and to transmit notification information obtained near another information source to this information source. The information terminal with the delay tolerant communication function, which moves from location to location, may be called a message ferry (or simply a ferry).

DTN technology and a ferry are disclosed in Patent Document 1. Disclosed in this document is a mechanism of preventing an unnecessary exchange of notification information, by providing a scheme for storing and keeping in a DTN terminal as communication path information (communication connection history information which records terminals within the range of communication and terminals having a chance of communication) another DTN terminal to which the DTN terminal in question is currently connected and other DTN terminals to which the DTN terminal in question was connected in the past, and a scheme for exchanging the communication path information with another DTN terminal.

By supporting the relay transmission of notification information in conformity with the concept of delay tolerant communication in the manner described above, information can be transmitted between information sources that fail to establish a network connection to each other. This method is an application of the function of temporarily saving notification information to be transmitted, which is a part of the delay tolerant communication function. One of indices that are given importance in this communication method is a delay in information transmission, and how to reduce the transmission delay as much as possible is being studied as disclosed in Non Patent Document 1. An approach to solve a similar problem is disclosed in Non Patent Document 2.

PRIOR ART DOCUMENTS

Patent Document

Patent Document 1: JP-A-2012-119926

Non Patent Document

Non Patent Document 1: K. Habibul Kabir et al, "OPTIMAL VISITING ORDER OF ISOLATED CLUSTERS IN DTNS TO MINIMIZE THE TOTAL MEAN DELIVERY DELAY OF BUNDLES", NUMERICAL ALGEBRA, CONTROL AND OPTIMIZATION Volume 1, Number 4, December 2011 pp. 563-576

Non Patent Document 2: K. Habibul Kabir et al, "Grouping Clusters to Minimize Mean Delivery Delay of Bundles in Ferry-Assisted DTNs", Technical Report of The Institute of Electronics, Information and Communication Engineers Volume 111, 408 (NS2011 145-178), Jan. 19, 2012, pp. 87-92

SUMMARY OF THE INVENTION

Problem to be Solved by the Invention

In recent years, a possible application of an information terminal having the scheme of delay tolerant communication is beginning to be investigated in which the information terminal is used for exchange of local information in place of a communication network that is damaged and rendered incapable of communication by immediately after of a catastrophe or the like. In such events, shelters serving as information sources (sources of transmission and consumption of notification information) are dispersed over a wide area, isolated from one another. It is also known that communication networks of shelters are often disconnected in such events with the loss of existing infrastructure. The existing infrastructure here includes cable communication lines, mobile communication facilities, and power networks. The compounded loss of those ruins a communication network. The locations and scales of shelters are not definitive beforehand and, in addition, are known to changes with time.

When information transmission utilizing ferry DTN is executed in an attempt to transmit information between shelters under the condition described above, using a single ferry DTN terminal to circuit all shelters is not efficient. It is generally desirable to use all ferry DTN terminals that are available at that point for exchange of notification information from each shelter.

An information transmission method that could be efficient under this situation involves, assigning shelter(s) to a plurality of ferry DTN terminals in a manner that minimizes transmission delay, collecting notification information from the assigned shelter(s) at each ferry, and then sharing the collected notification information among the plurality of ferries, thereby connecting the shelters to one another.

If many types of environment information such as the number and locations of shelters, the number of ferry DTN terminals, and map information can be gathered in one place, an optimization calculation that uses the gathered environment information is feasible by employing the approach disclosed in Non Patent Document 1 or 2. The optimization calculation has a possibility of being capable of efficient shelter(s) assignment to each ferry and optimum setting of timing to share information between ferries and other settings.

However, in cases such as a great earthquake, to construct a system for performing the optimization calculation, which requires gathering environment information in one place in short time and tremendous computation processing, may not be possible due to transmitted information needs to travel a wide area and a disruption to network infrastructure. Even after the optimization calculation is performed, the assignment of a place to each ferry (the assigned range) and timing to share information between ferries need to be set anew so that the situation on the site, which changes moment by moment is reflected. Taking those suppositions into consideration, it would be difficult to gather environment information, perform the optimization calculation at once, and build up a network that reflects the result of the optimization calculation in the event of a disaster.

For example, a new arrival or departure of a rescue party or the like that carries DTN terminal(s) in an afflicted area may increase the number of information sources themselves, or may increase or reduce the number of DTN terminal(s) available for use. It may also be necessary to deal with an increase in the number of communication devices that is brought on by the setting up of rescue headquarters.

A technology with which a better communication environment can be built up under this condition by changing the assigned areas of the respective ferries in real time and in overview in a manner that fits the situation on the site is hoped for the technology.

In other words, what is sought after is a technology of transmitting notification information effectively in a situation where network connections cannot be established over a wide area and gathering collected information in one place is difficult.

The inventors of this invention have therefore investigated an effective way of optimizing transmission delay in real time.

This invention provides a delay tolerant network and an information transmission method, which relate to a delay tolerant communication method and optimize assigned ranges of respective information transfer devices in real time in a manner that fits the situation on the site, thereby optimizing the transmission delay throughout the whole range in real time. This invention also provides an information transfer device from which the delay tolerant network is built, and a recording medium.

Means to Solve the Problem

According to one embodiment of this invention, there is provided an information transfer device, including: a communication unit to communicate to and from another device within a communication range that is connected to the information transfer device; and a storing unit to store and keep notification information that is received via the communication unit to be relayed, in which the information transfer device further includes a delay tolerant communication unit to exchange the notification information stored in the storing unit with another device when the exchange becomes possible, and the information transfer device further includes a control unit to exchange environment information with another information transfer device, and to execute deriving processing an assigned range that is assigned autonomously to its own information transfer device, based on the environment information that is kept by its own information transfer device, through a planarization search processing in which a value is evened out between its own information transfer device and other information transfer devices, the assigned range being one of ranges that are shared between its own information transfer device and the other information transfer devices as their assigned ranges.

According to one embodiment of this invention, there is provided an information transmission method, including building a delay tolerant communication network from a plurality of information transfer devices that collected and kept notification information when the exchange becomes possible, which each of the plurality of information transfer devices includes a communication unit to communicate to and from another device within a communication range that is connected to the information transfer device, and a storing unit to store and keep notification information and each of which exchanges environment information with another information transfer device to executing processing of deriving an assigned range that is assigned autonomously to itself, based on the environment information that is kept by itself, through a planarization search processing in which a value is evened out between itself and other information transfer devices, the assigned range being one of ranges that are shared between itself and the other information transfer devices as their assigned ranges.

According to one embodiment of this invention, there is provided a recording medium having recorded thereon a program for controlling a control unit of an information transfer device for delay tolerant communication so that the control unit operates as control means, the information transfer device including a communication unit to communicate to and from another device within a communication range that is connected to the information transfer device, and a storing unit for storing and keeping notification information that is received via the communication unit to be relayed, the information transfer device further including a delay tolerant communication unit for exchanging the notification information stored in the storing unit with another device when the exchange becomes possible to build a delay tolerant communication network, the control means exchanging environment information with another information transfer device, and executing processing of deriving an assigned range that is assigned autonomously to its own information transfer device, based on the environment information that is kept by its own information transfer device, through a planarization search processing in which a value is evened out between its own information transfer device and other information transfer devices, the assigned range being one of ranges that are shared between its own information transfer device and the other information transfer devices as their assigned ranges.

Effect of the Invention

According to the one embodiment of this invention, it is possible to provide the delay tolerant network and the information transmission method, which relate to the delay tolerant communication method and optimize the assigned ranges of the respective information transfer devices in real time in a manner that fits the situation on the site, thereby optimizing the transmission delay throughout the whole range in real time. Further, it is possible to provide the information transfer device from which the delay tolerant network is built, and the recording medium.

For example, this invention enables shelters to share various types of information speedily immediately after a great earthquake, and thus reduces "information vacuum".

MODES FOR EMBODYING THE INVENTION

Figure 1:
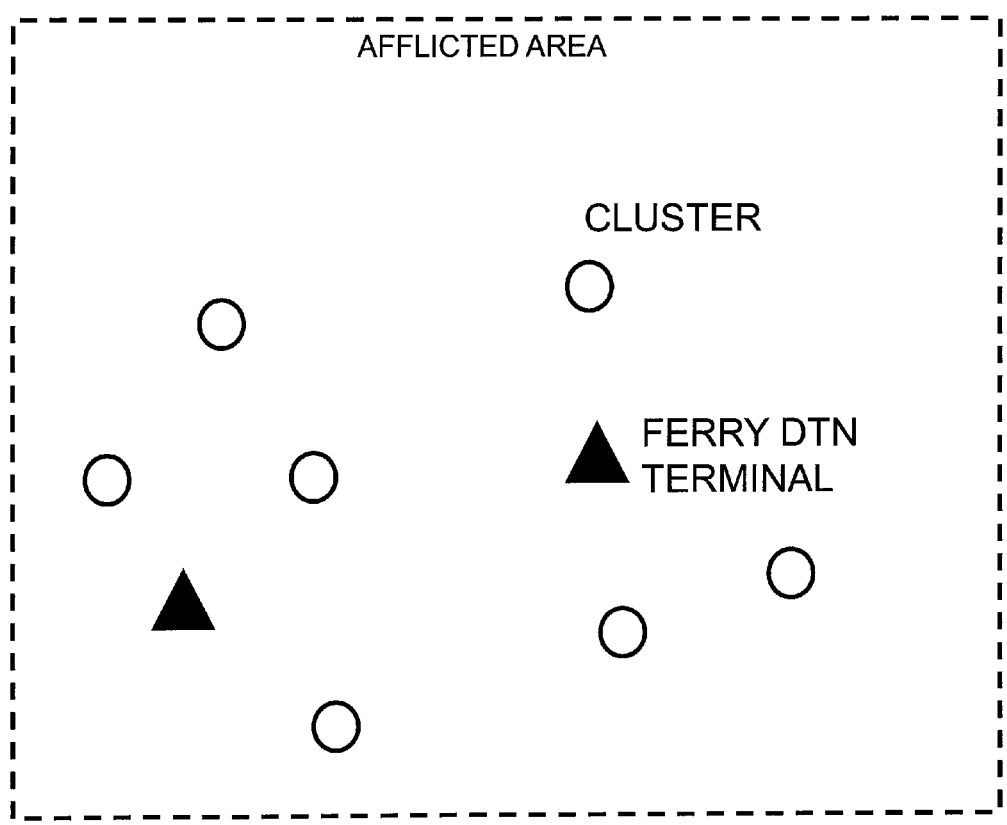
FIG. 1 is an explanatory diagram illustrating a situation that is mentioned in a description of an embodiment mode of this invention.

An embodiment mode of this invention is described below with reference to the drawings. Some of technical terms of DTN technology are used in the description given here. Notification information is called a bundle, a message, or the like. Environment information is pieces of information about the condition of a delay tolerant network that is built, such as the locations of individual information devices and clusters within a range where the delay tolerant network is built, the number of ferries, map information, traffic restriction information, and sink locations. Environment information characteristically changes from moment to moment, and is added so as to reflect current conditions by various methods.

Each information transfer device has a scheme for temporarily storing and keeping notification information when the notification information is to be transferred and a path to a destination of the notification information is not determinate, and for exchanging (transferring) the stored notification information when an information exchange with another information transfer device becomes possible.

The information transfer device derives as the need arises a travel strategy for accomplishing an information exchange with another node and a travel range that is assigned to itself, and operates by following a rule derived by itself.

With some or all of nodes operating according to this invention, the overall transmission delay of the delay tolerant network can be optimized in real time.

Each information transfer device determines the travel range assigned to itself by evening out load among the information transfer devices, by the total travel distance, the total travel time, or the like as a using parameter.

Specifically, a planarization search is conducted in which a cost necessary to connects one segment and another segments in delay tolerant communication is used as the parameter to planarize the overall cost of other segment(s) each other. For example, in the case where there is a node that is to be assigned to one of two information transfer devices, processing is executed which involves calculating, for each of the two information transfer devices by taking the communication range of the node into account, a travel distance or travel time that is expected if the node is to be assigned to this information transfer device, and adding the node to the assigned range of the information transfer device that is smaller in the travel distance or travel time.

Each information transfer devices desirably notify information that is used in the planarization to one another as the latest environment information at each time.

In other words, each information transfer device operates so that its own cost value is obtained by other information transfer devices while obtaining cost values of other information transfer devices, and adjusts its assigned range in a manner that makes its own cost value equal to the cost values of other information transfer devices. After that, each information transfer device derives a path that circuits its assigned range as the travel strategy.

For example, each information transfer device may perform the calculation of its cost to exchange the calculated cost value as well as environment information with other information transfer devices, or adjacent information transfer devices may notify evaluation functions that are used in the cost calculation, or information related to the cost calculation, to each other. Alternatively, the information transfer devices may exchange the evaluation functions, or values calculated by using the evaluation functions, with each other via another device. Each information transfer device can define its assigned range and travel strategy at arbitrary timing in an arbitrary location.

Each information transfer device may operate so as to collect notification information in a given information device, and so as to obtain notification from, and transfer notification to, an information device where notification information of another information transfer device is collected. Each information transfer device may also make arrangements with another information transfer device to exchange notification information.

The travel strategy of each information transfer device may include a path that is used after the information transfer device obtains, through an exchange, for keeping, notification information collected in the assigned range of another information transfer device to accumulate the kept notification information in a given device which is within its own assigned range.

The travel strategy of each information transfer device may also include a path that is used by the information transfer device to travel to the communication range of a given device where notification information and environment information of another information transfer device are accumulated, and to obtain the accumulated information. The travel strategy may also be a strategy for traveling to the communication range of a given device at given intervals or at a given point in time.

Figure 2:
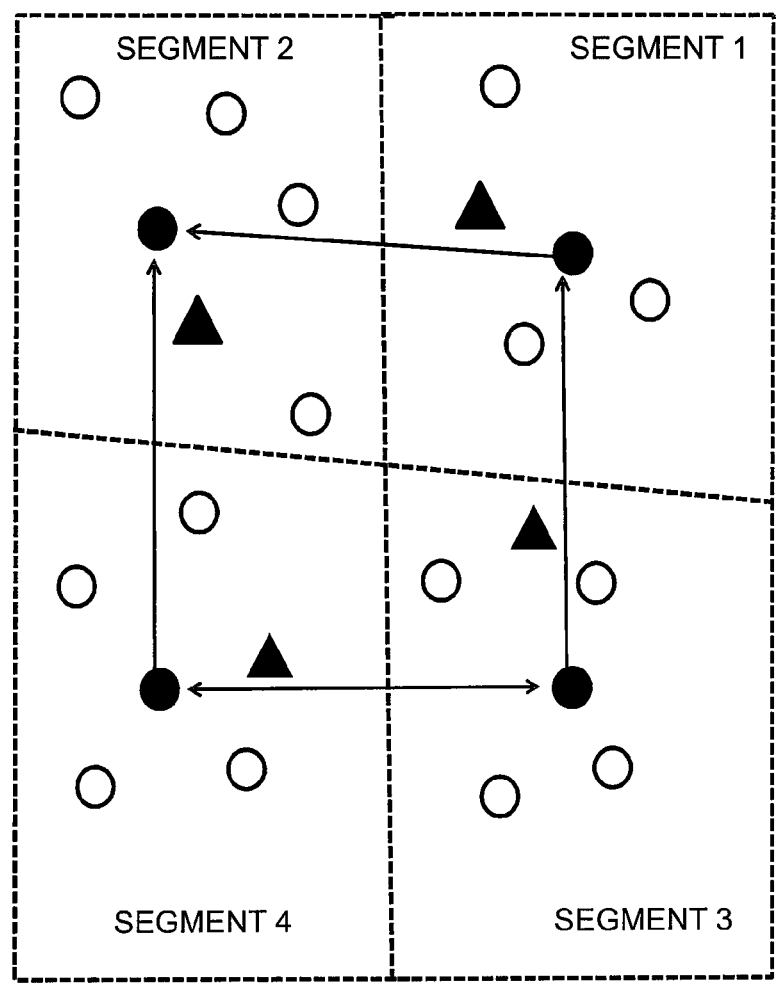
FIG. 2 is an explanatory diagram illustrating a schematic method of moving a ferry DTN terminal in the embodiment mode.

To describe this invention, a situation in which this invention functions effectively is described first with reference to FIG. 1 and FIG. 2.

Each circular mark noted as "cluster" in FIG. 1 represents a place that has one or a plurality of information sources, i.e., a group of devices treated as a cluster. An information source can be a cellular phone, a personal computer, a disaster preventing device, or many others. Each triangular mark noted as "ferry DTN terminal" represents an information transfer terminal, which includes a storing unit and travels to collect and transmit respective pieces of notification information from clusters.

Notification information of an individual cluster may be collected from/distributed to the cluster's each information source by a ferry DTN terminal itself by traveling within the cluster. A premise of the description given here, however, is that each individual cluster includes a terminal $K_i$ (i represents the cluster number) for compiling/distributing notification information.

The ferry DTN terminal obtains notification information of each cluster from each terminal $K_i$ of the cluster, and transfers to the terminal $K_i$ notification information collected from another cluster.

Various information devices in the cluster appropriately obtain notification information issued by another cluster, by receiving the distribution of the notification information from the terminal $K_i$. A method of communication within the cluster can be any method, and a common communication method or DTN may be used for the communication.

Discussed here is a situation in which DTN nodes are run with this scheme in order to make information transmission possible in an environment where a constant network connection is unavailable as in a catastrophe.

How N ferry DTN terminals are to travel in the situation described above to be efficient in terms of transmission delay is considered.

One of matters that are given importance in the situation where a constant network connection is unavailable is transmission delay of notification information. Transmission delay is the length of time from the issuing of notification information to the arrival of the notification information at the destination. Information transmission is closer to smooth transmission when a mean transmission delay of all pieces of notification information is smaller. Accordingly, an efficient way of running ferry DTN terminals can be paraphrased as a way for ferry DTN terminals to transmit information with less overall mean transmission delay.

The simplest way of running ferry DTN terminals is random operation. However, random operation leaves everything to chance and has no guarantee that all pieces of information are transmitted. Another problem of random operation is that the amount of notification information to be transmitted could become too large as disclosed in Patent Document 1, depending on the network scale.

The inventors of this invention have therefore devised a method of running information transfer devices in which some or all of nodes operate according to this invention, thereby optimizing the overall transmission delay of a network in real time as described above.

This information transfer device running method is applied to ferry DTN terminals to provide a superior store-and-forward transfer method.

FIG. 2 illustrates an example of a schematic method of moving a ferry DTN terminal according to the embodiment mode.

Each ferry DTN terminal has an area assigned to itself in an autonomous decentralized manner (hereinafter referred to as segment), and derives a travel plan so that notification information of every cluster in the segment is collected.

In the explanatory diagram of FIG. 2 which is simplified, four segments form the whole delay tolerant network. This naturally means that the four segments combined are the total of areas assigned to all ferry DTN terminals.

Described below is a method of assigning, to each ferry DTN terminal, a cluster group that is to belong to a segment derived by the ferry DTN terminal (a method of determining an assigned cluster group). In the case where the premise is that each ferry DTN terminal derives a travel path along which one or more clusters appear in succession in a segment, the assigning of ranges and the assigning of clusters can be associated with each other.

An information exchange between individual segments is executed by ferry DTN terminals through store-and-forward transfer, which, however, does not make an information exchange between segments efficient on its own. One of clusters in a segment is therefore set as a focal point of gathering information in the segment. The cluster that is the focal point of gathering information is called a sink (node).

Each ferry DTN terminal first gathers information issued from clusters in its assigned segment to the sink. The ferry DTN terminal can gather the information by various methods. The various methods include traveling along a path that is obtained with the use of a solution to the traveling salesman problem asking for the shortest path that has the sink as the start point and circuits other clusters before returning to the sink, and a method disclosed in Non Patent Document 1 in which the ferry DTN terminal travels back and forth between the sink and clusters.

An arrow linking sinks to each other in FIG. 2 means that a ferry DTN terminal visits the sinks for an information exchange. In other words, the travel path of each ferry DTN terminal includes a section between sinks that are linked by an arrow.

When this manner of collecting information in a segment is employed, all pieces of information in the segment gather in the sink at given time intervals, and the segment can exchange information with another segment through its own sink and the sink of the other segment.

In other words, a ferry DTN terminal travels from one segment to the sink of another segment at certain time intervals to obtain notification information collected in the other segment, and to transfer notification information transported by itself, thereby accomplishing information transmission between the segments. The ferry DTN terminal at this point also obtains, through delay tolerant communication, environment information of the segment with which the ferry DTN terminal is exchanging information (if necessary, environment information of still another segment obtained via the segment with which the ferry DTN terminal is exchanging information).

In the case where segments are coupled to one another by a network, information transmission gradually progresses inside and outside each segment, and repeating information transmission at each segment spreads notification information throughout the network. However, information of one segment that is obtained by a segment that is located far from the one segment is low in real-time property, and hence the situation may have changed by the time the information is obtained. It may accordingly be said that autonomous decentralized processing is more useful in which only environment information exchanged between neighboring segments is used to assign ranges appropriately, which is one of the features of this invention.

The sink in a segment is not necessarily limited to one node.

Each ferry DTN terminal does not need to travel to the sinks of every one of other segments than its own, and, at certain time intervals, a notification information transmission probability (the probability of notification information arriving at the destination information terminal) can have a value "1" if information is transmitted to and from the sink of at least one neighboring segment.

The transmission probability being "1" means that every piece of notification information is delivered to its destination information terminal without fail, and guarantees a higher reliability than that of a method of moving ferry DTN terminals at random or other similar methods.

This invention uses the travel routine of FIG. 2 as a basis. The travel routine involves processing of deriving segment assignment (area assignment among ferries) that reduces transmission delay more.

The problem may be solved as a combinational optimization problem in the case where environment information of every cluster is obtained successfully and the number of ferry DTN terminals available for use is known and does not change. On the other hand, there is a problem in that an increase in cluster count or ferry DTN terminal count increases the calculation time exponentially.

In addition, a catastrophe or the like may make centralizing all pieces of environment information difficult in actual operation in terms of collection and management.

It is in large part difficult for the combinational optimization problem to handle the proper assigning of shelters treated as clusters (including newly assigning rescue headquarters or the like) in a manner that reflects the ever changing situation on the site, and to handle information processing for setting the timing of information sharing between ferries.

This invention therefore revises the centralized approach in which environment information is centralized to solve a problem, by figuring out anew a mode that fits the situation under which a delay tolerant network to be built is run.

This invention uses an autonomous decentralized approach as a way to assign segments favorably even under a severe situation where each ferry DTN terminal can exchange information only with neighboring ferry DTN terminals, and, in addition, allows each individual ferry DTN terminal to cooperate with its surrounding devices with the use of environment information that the ferry DTN terminal has managed to collect locally. As a result, a delay tolerant network capable of favorably running resources that are dispersed in a range where the network is built is provided.

The case of an earthquake is assumed in the following description of the embodiment mode. The processing flow of the devised method is described as follows:

Premises are described before a detailed description on the devised method is given.

Considering operation in a catastrophe, planning and executing the post-catastrophe deployment of ferry DTN terminals immediately is difficult for a department that manages the terminals in a centralized manner. It would therefore be appropriate to proceed with collection and exchange of notification information with the use of ferry DTN terminals provided beforehand to shelters or the like.

In the case where a shelter has an automobile, the automobile carrying a ferry DTN terminal may circuit. Alternatively, ferry DTN terminals may have travel means which moves autonomously. When there is no means of travel, a person needs to carry a ferry DTN terminal around to collect notification information manually.

The most realistic scenario is that a ferry DTN terminal starts its circuit for collecting notification information from the place where the ferry DTN terminal has been, which is a situation assumed in the description of this embodiment mode. Providing sinks are also assumed, as well as disposing a sink in a place where a ferry DTN terminal has been located.

In this scenario, a ferry DTN terminal operates so as to collect and accumulate notification information in a sink that is in a place where the ferry DTN terminal has been located. The sink exchanges notification information and environment information with the ferry DTN terminal, and may exchange information with its surrounding information terminals.

A cluster in the following description can be a single information terminal instead of a plurality of information terminals. However, a shelter-scale or settlement-scale cluster, which is an aggregation of a plurality of information terminals, is more realistic, and therefore is assumed in the description given here.

The first step of the devised segment assignment (assigned range) is to set an initial range. In the situation described above, a ferry DTN terminal does not know where other clusters are, and does not know where sinks of other segments are. The simplest way of setting an initial value of segment assignment is a method in which a ferry DTN terminal, taking the radius of its coverage into account, makes an action plan to search its surroundings with a sink at the center, while taking care that no cluster or sink is missed, and to accumulate collected notification information and other types of information in the sink in arbitrary cycles, and collects environment information by sequentially identifying the locations of clusters, the location of sinks of adjacent segments, and the like.

The ferry DTN terminal conducting the search returns to its the self sink in the arbitrary cycles to transmit to and accumulate in the sink environment information, such as a cluster location identified by the ferry DTN terminal, and collected notification information. After transferring the notification information and others to the sink, the ferry DTN terminal again leaves for the search and information collection. In addition to executing this action plan, the ferry DTN terminal, upon finding a sink of an adjacent segment, obtains environment information of the adjacent segment (the cluster locations and assigned range of the adjacent segment), receives notification information collected in the adjacent segment, and transfers notification information that has been collected and accumulated in its own segment. When entering the communication range of a dynamically traveling node which is, unlike a cluster, not stationary, the ferry DTN terminal exchanges environment information and notification information with the node as the need arises.

The ferry DTN terminal checks that the surrounding areas are covered by itself and adjacent segments as a result of repeated travel and communication that follow the action plan, and then the setting of the initial value is complete. In the setting of the initial value, a cluster that belongs to none of segments newly found by the ferry DTN terminal through the search is used as an initial value.

Figure 3:
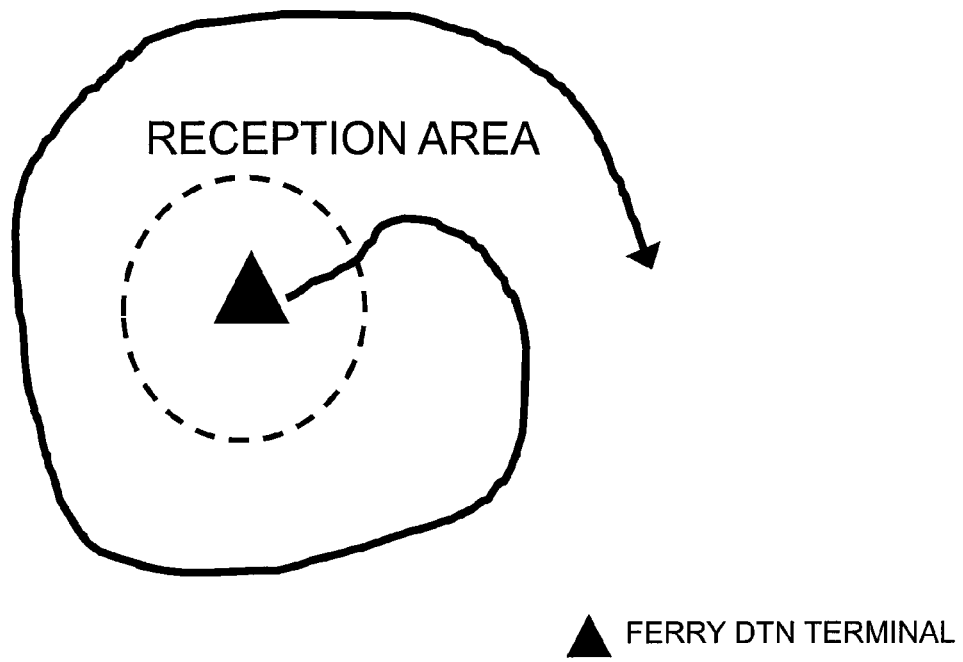
FIG. 3 is an explanatory diagram illustrating an example of how to search for an initial cluster and an initial sink in the embodiment mode.

FIG. 3 is a schematic diagram illustrating an example of this search action plan. As illustrated in FIG. 3, a ferry DTN terminal on a circuit expands the searched range by taking the communication range into account and making sure that no cluster or sink is missed. This method is an example, and any one of many possible search methods can be employed.

The search which involves traveling generally takes time. If the location information and the like of candidates for clusters are registered in advance and ferry DTN terminals use the information, the initial value can be determined in a short time. In addition, a ferry DTN terminal traveling and searching based on the information finishes the search in a relatively short time.

This premise is suitable for the use in an area afflicted by a catastrophe, and can be carried out by providing ferry DTN terminals in advance to some of places that are candidates for shelters, and inputting all shelter-candidate places of a municipality in question. Alternatively, an initial value such as which cluster is assigned to a ferry DTN terminal may be set in advance. Registering such settings in advance saves time in the search significantly.

However, it is a possibility that a shelter provided with a ferry DTN terminal is afflicted itself by a catastrophe. A case where a candidate for a shelter is not actually run as the shelter is also expected. Considering such situations, the need to conduct the search is high. With the possible loss or failure of a ferry DTN terminal that is assigned to one segment, a ferry DTN terminal desirably enters the next processing after recognizing through the search the presence or absence of sinks in adjacent segments and clusters assigned to itself, and identifying the situations of the adjacent segments and the clusters.

In the case where no ferry DTN terminal is assigned to an adjacent segment or an adjacent segment has no sink (including cases of malfunction), a ferry DTN terminal recognizing the fact needs to temporarily take care of the adjacent segment in addition to its assigned segment. The ferry DTN terminal, when executing a preset initial value, corrects the initial value so that the adjacent segment is included, and uses the distribution thereof or the like as an initial value.

A ferry DTN terminal proceeds to the next step after figuring out by the search method described above the locations of clusters that are currently surrounding the ferry DTN terminal, and the sink locations of adjacent segments, which are used as initial values.

When information of clusters is to be compiled in a single segment, reducing the total travel distance of a ferry DTN terminal as much as possible is desired from various viewpoints, as disclosed in Non Patent Document 1.

In this case, how the ferry DTN terminal travel varies depending on, for example, whether or not the travel strategy is made by taking the queueing theory into account. Whatever travel method is employed, a desirable travel strategy is one that minimizes the total travel distance in the travel method used. A passable travel route is desirably chosen with the use of map information or the like for the measurement of the total travel distance.

In this invention, when a ferry DTN terminal successfully obtains cluster information of an adjacent segment, the ferry DTN terminal and a ferry DTN terminal of the adjacent segment each calculate, for each cluster, which of the sink of its own segment and the sink of the adjacent segment the cluster is close to, and clusters are exchanged between the segments so that each cluster belongs to a segment whose sink is closer to the cluster in terms of cost. This is the second step. This exchange between segments enables ferry DTN terminals to shift its assigned cost to each and all.

A cluster-segment affiliation relation temporarily set as an initial value is thus changed to reconstruct the network in a manner that reduces the total consumption cost (travel distance, travel time, or the like) of ferry DTN terminals as much as possible.

With the execution of steps up through the second step completed, the network seems to have acquired a structure that requires a minimum total travel distance or total travel time of the overall system, and the overall transmission delay decreases accordingly. However, several problems remain.

Figure 4:
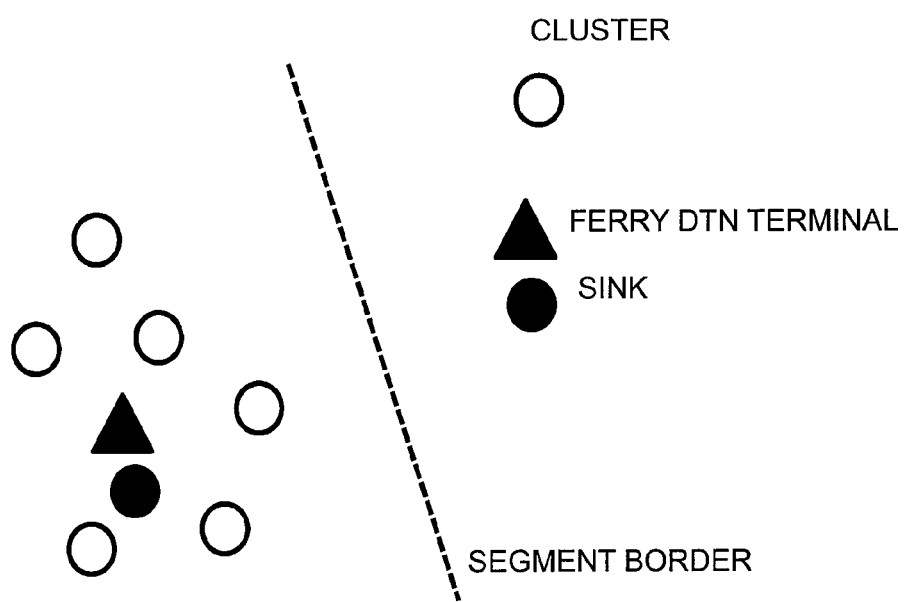
FIG. 4 is an explanatory diagram illustrating an example of segment assignment in which consumption costs of clusters are unbalanced.

A situation as the one illustrated in FIG. 4, for example, occurs in the processing up through the second step. As in the segment on the left-hand side of FIG. 4, a ferry DTN terminal that has a sink surrounded by many clusters at a close distance from the sink is assigned many clusters. A ferry DTN terminal that has a sink with few clusters in the neighborhood, on the other hand, are assigned few clusters as in a segment on the right-hand side of FIG. 4.

The ferry DTN terminals in this state are unbalanced with each other in terms of cost necessary to circuit all assigned clusters. This unbalance results in an obstacle to the improvement of the overall mean transmission delay of the delay tolerant network because, for example, the unbalance increases the transmission delay of notification information in a segment where the total travel distance is long.

The third step is therefore processing of balancing the consumption cost such as the total travel distance or the total travel time between segments. In other words, costs incurred by assigned resources are evened out. Travel paths are determined as well. This can be regarded as a problem of balancing load between segments in an autonomous decentralized manner.

This processing, along with the second step, is executed repeatedly and dynamically.

The autonomous decentralized load balancing method already devised by the inventors of this invention can be applied to the load balancing between segments. An autonomous decentralized load balancing control method using a convex function, which can be employed in the third step, is described later.

In the autonomous decentralized load balancing control method using a convex function, elements are ferry DTN terminals and the load on a ferry DTN terminal is the total travel distance, total travel time, or the like of its assigned segment. The axis of abscissa of the terminal's evaluation function therefore represents the total travel distance or the total travel time.

The axis of abscissa in the following description is set as the total travel distance for the sake of convenience. The axis of ordinate can be set in relation to the performance of ferry DTN terminals. In other words, performance differences among ferry DTN terminals that form a network can be utilized in network building by setting the performance differences as differences between maximum values of evaluation functions (convex functions). Several setting examples thereof are described in embodiments.

The consumption costs of the respective ferry DTN terminals which are derived so that the value on the vertical axis of the evaluation functions eventually becomes maximum in the overall system are obtained by performing moment-by-moment control in a manner that equalizes the set differential values of the evaluation functions.

The thus obtained consumption costs of the respective ferry DTN terminals are costs incurred by resources that are to be assigned to the individual terminals, for example, the total travel distance of travel between sinks and clusters. A cluster to be assigned is determined from the total travel distance, i.e., the segment range is determined from the cost.

As described through the case given above, the segment range is the affiliation relation of many scattered clusters itself. Adjacent clusters therefore exchange clusters with each other so that the value at which costs calculated by load balancing calculation, such as the total travel distance, are balanced is reached.

In a concrete example, a segment (ferry DTN terminal) that is to be reduced in total travel distance hands over a suitable cluster out of clusters belonging to itself to an adjacent segment that is to be increased in total travel distance. "Handing over a cluster" means that the affiliation relation of the cluster is changed, i.e., the ferry DTN terminal assigned to the cluster is switched to another terminal.

In this manner, load balancing control using a convex function is performed to change, in each ferry DTN terminal, at certain timing, the cluster affiliation relation with respect to the ferry DTN terminal and its adjacent ferry DTN terminal, until a suitable total travel distance derived from the evaluation function is reached and the overall balance is achieved. Favorable segment assignment is thus accomplished in the overall system in an autonomous decentralized manner. The timing for changing the affiliation relation may be determined through an exchange of environment information with the adjacent ferry DTN terminal, or may be executed at regular intervals set in advance. The changing of the affiliation relation may also be executed after two terminals between which clusters are exchanged both accede to the change.

The third step has now been described.

The shifts in the manner of overall network control from the first step to the third steps realize cluster assignment that is favorable on the whole, despite the unbalanced situation, which remains through the second step (see FIG. 4).

The description given above is of a mode in which the total travel distance does not include a distance traveled by a ferry DTN terminal to reach an adjacent sink, in order to promote understanding. Ignoring a distance that is traveled to reach an adjacent sink has little consequence when there are great many clusters. In the case where more precise load balancing throughout the network is to be executed, it is desirable for a cost that serves as a reference for calculation to include a distance traveled to reach an adjacent sink and other minor distances.

Figure 5:
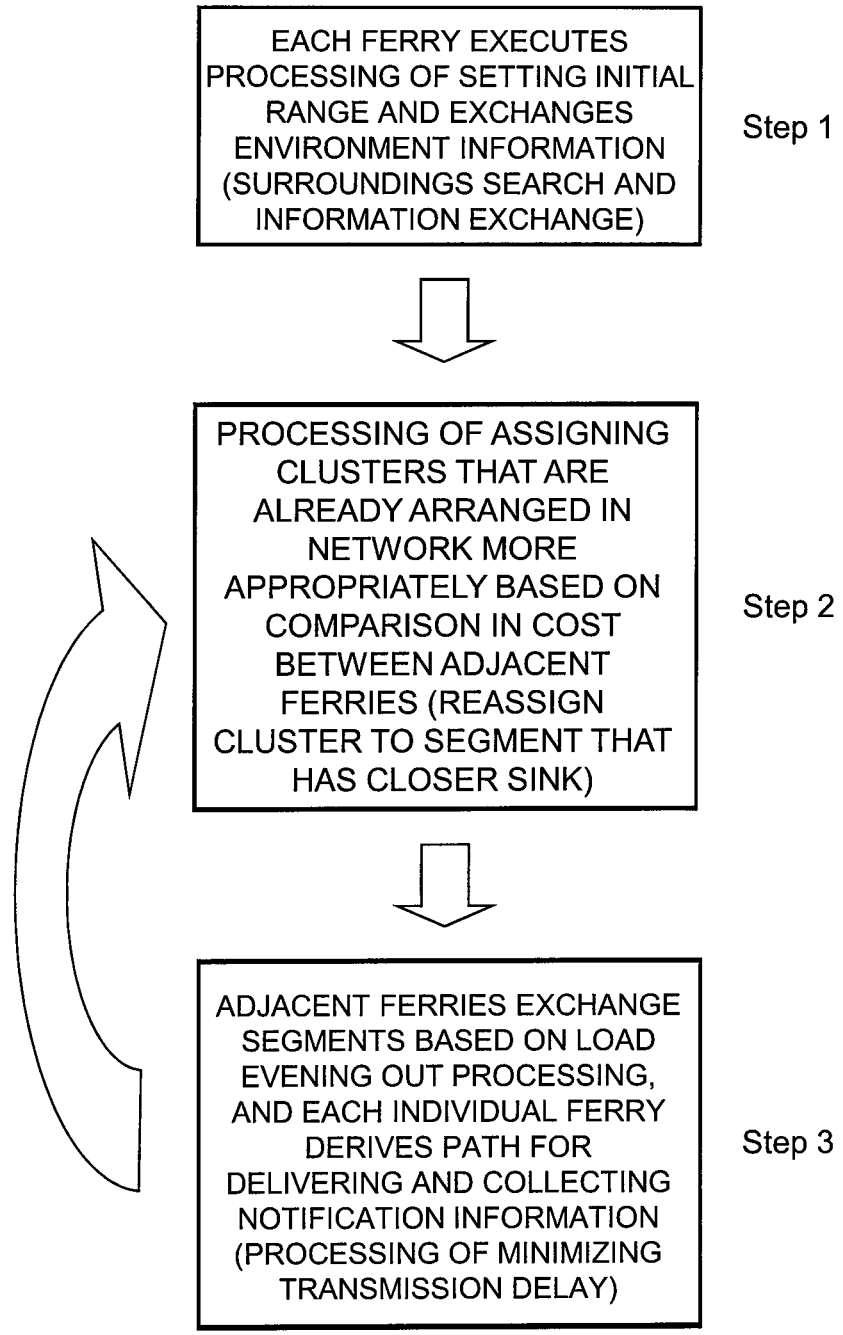
FIG. 5 is a flow chart illustrating an overall network control sequence according to the embodiment mode.

The operation described above is organized into a schematic processing sequence, which is illustrated in FIG. 5.

FIG. 5 illustrates how the overall processing of the delay tolerant network shifts from one processing phase to another. The processing is subsequently executed in an autonomous decentralized manner.

Each ferry executes processing of setting the initial range and obtains environment information of at least an adjacent segment (Step 1). When obtaining the environment information, each the ferry obtains the locations of clusters belonging to the adjacent segment and the like.

Each the ferry exchanges arranged clusters (in the initial arrangement or an arrangement created in Step 3 by splitting between the ferry and the adjacent ferry) with the adjacent ferry based on the costs (Step 2). Providing this processing phase speeds up the completion of overall optimization of the network.

Each the ferry determines its assigned range by exchanging segments with the adjacent ferry based on processing of evening out the load, and derives a route for efficiently circuiting the determined assigned range (Step 3).

Thereafter, each the ferry repeats Step 2 and Step 3 sequentially with the passage of time or the acquiring of new environment information as a trigger, while exchanging notification information.

Using this information transmission method allows for dynamic segments assignment that fits the ever changing situation on the site, and circuiting an assigned range efficiently and individually minimizes the overall transmission delay.

In other words, a delay tolerant network can be provided which optimizes assigned ranges of respective information transfer devices in real time in a manner that fits the situation on the site, thereby optimizing the transmission delay throughout the whole range in real time.

A brief description is now given on the autonomous decentralized load balancing method which is already devised by the inventors of this invention and which can be used in the third step.

[Autonomous Decentralized Load Balancing Control]

The inventors of this invention devised in the past a method of balancing load optimally on the whole by controlling a plurality of elements in an autonomous decentralized manner. The elements are servers, generators, and other various devices among which load is to be balanced. The elements in this invention are ferry DTN terminals.

In the devised autonomous decentralized load balancing method, an evaluation function is set to each element first which is fit to the performance of the element. The evaluation function is outlined in FIG. 6. The axis of abscissa represents, for each element, a parameter related to the state of the element, and the axis of ordinate represents an index related to some kind of efficiency, profit, the performance of the element, the priority of the element, or the like. In an example of server load balancing, the axis of abscissa corresponds to the volume of processing load on a server or the like, and the axis of ordinate is assigned an index for efficiency, performance, or the like. This evaluation function is expressed as a convex function.

Figure 6:
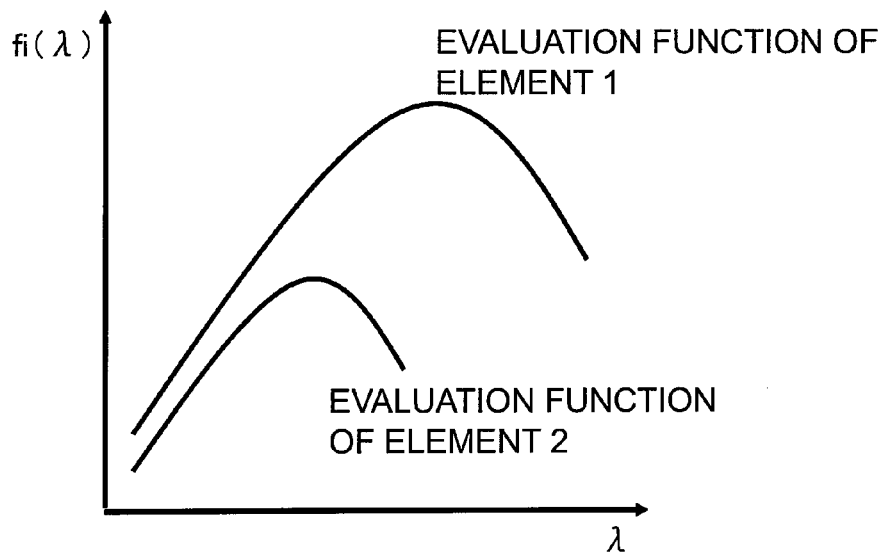
FIG. 6 is a schematic diagram of an evaluation function used in the embodiment mode.
Figure 7:
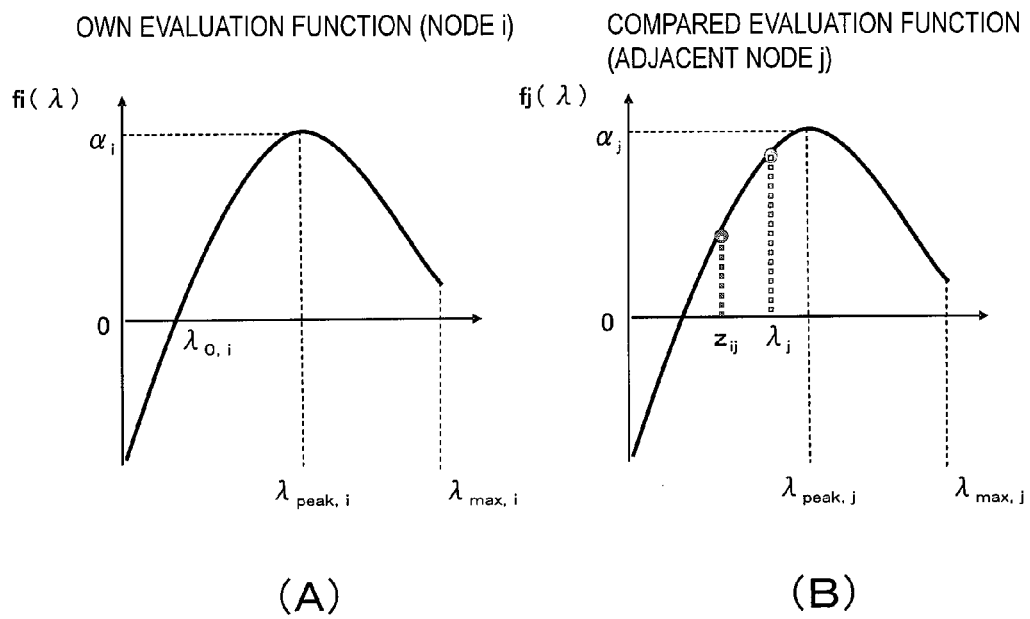
FIG. 7 shows explanatory diagrams that are referred to in a description of load balancing processing operation by way of comparison between evaluation functions.

Using a convex function which is another point of this control method has been decided because efficiency and other indices of many systems are expressed by a convex function such as the one shown in FIG. 6. While there are cases where a function convexed upward as in FIG. 6 is called a concave function and a function convexed downward is called a convex function, an expression that discriminates functions by their nature is employed to express the concave function as a convex function as well.

A problem for achieving the overall optimization (a state where the sum of evaluation function values of the respective elements is maximum) by coordinating a plurality of elements whose evaluation functions are convex functions is known as a "convex programming problem". It has mathematically been elucidated that, in this problem, optimization is achieved in a state where differential values of the evaluation functions of the respective elements on the operation level are equal to one another. The load balancing method devised by the inventors of this invention is an application of this principle. Reasons for using a convex function as the evaluation function include the fact that the principle has been proven mathematically.

Taking this principle into account, a change in the state (load in the case of a server) of each element is controlled in a manner that conforms to, for example, the following equation, Expression (1):

$$\frac{d\lambda_i}{dt} = K_1 \cdot \left(\frac{df_i}{d\lambda_i} - \frac{df_k}{d\lambda_k}\right) \quad (1)$$

$\frac{df_i}{d\lambda_i}$ differential value of evaluation function

In Expression (1), $K_1$ represents a coefficient that corresponds to a gain in state change, and k represents a number assigned to an element that is adjacent to an element i.

Individual elements perform this control in an autonomous decentralized manner, thereby operating to change their state so that differential values of the evaluation functions of the respective elements are equalized. This is equivalent to control that brings the state (the volume of load) of each element to a point where the overall profit is maximized. Specifically, the efficiency set on the axis of ordinate of the evaluation function is maximized in the overall system through the control expressed by Expression (1).

In the case where an element has a plurality of adjacent elements, the control expressed by Expression (1) is repeated sequentially. This mathematical expression is just an example, and the point is to determine the state of elements where differential values of evaluation functions set to the respective elements are equalized, and to bring the elements to that state.

The load balancing method described above can also be used to determine whether to stop an element that does not merit being in operation.

First, an index is defined for the evaluation function of the element (node) itself and for the evaluation function of a node adjacent to the element (node). FIG. 6 is an explanatory diagram showing the two indices.

In the example given here, each evaluation function takes a negative value when the load is 0, which means that a cost is generated by booting up the node. A cost generated at the start of node operation, for example, human resources, may be assigned to this value, or a cost related to the initial search may be included in this value. In the case of optimizing server response, the axis of ordinate represents an amount related to the response, and the evaluation function takes a positive value at a load of "0" as well. When the processing advances through the processing phases and the additional cost reaches the minimum value or so, the evaluation function of each individual node may be switched to an evaluation function whose initial value is 0 or approximately 0.

Mathematically, the evaluation function can be positive and negative at a load of 0. If the processing is based on a method in which the evaluation function takes a negative value when the load is 0, a case where the evaluation function takes a positive value can be solved as a part of the method. The following description therefore deals with a general case where the evaluation function takes a negative value at a load of 0.

The zero crossing point of the node i (own device) is given as $\lambda_{0,i}$, a point in the evaluation function of the adjacent node j that has the same gradient as that of the zero crossing point of the node i is given as $z_{ij}$, and the current load of the adjacent node j is given as $\lambda_j$. The point $z_{ij}$ is accordingly expressed by Expression (2):

$$\left(\frac{df_j}{d\lambda_j}\right)_{\lambda_j = z_{ij}} = \left(\frac{df_i}{d\lambda_i}\right)_{\lambda_i = \lambda_{0,i}} \quad (2)$$

The following index is then defined:

$$S_i = \sum_{j \neq i} (\lambda_j - z_{ij}) = \lambda_{0,i} \quad (3)$$

This index indicates how much heavier the current load (the sum) of the adjacent node is than the zero crossing point of the node i. If the node i is not in operation at present, whether the node i is to be put into operation is determined by whether or not running the node i creates a situation in which the node i takes on a load heavier than the zero crossing point.

If the determination is made based on this threshold, running the node i benefits the overall network and booting up the node i does not cause disadvantage. The index $S_i$ is quantification thereof. The first term on the right side indicates that how much heavier the load on the adjacent node is than $z_{ij}$, which is equivalent to the evaluation function differential value at the zero crossing point of the node i. By subtracting the zero crossing point $\lambda_{0, i}$ from the first term on the right side (the second term on the right side), the index $S_i$ indicates that a load heavier than the zero crossing point of the node i is found around the node i.

In the case where $S_i$ is larger than 0, the node i takes on the load (clusters) of one of its adjacent nodes when booted up, and the assigned load of the node i is equal to or more than the zero crossing point. In the case where $S_i$ is smaller than 0, on the other hand, the load on the node i is equal to or less than the zero crossing point, even with the new load taken over from the adjacent node, and running the node i therefore undermines the benefit of the overall system.

Whether the node i is to be run or shut down can be determined by determining whether the value of the index $S_i$ is positive or negative. A negative value of $S_i$ means that the load of the node i at that point is in an area where the evaluation function takes a negative value, and that each node that is running is to be shut down when the evaluation function becomes equal to or less than 0. Whether to run or shut down an element can thus be determined by using the index $S_i$.

The method of determining whether to run a node that is a ferry with the use of the index $S_i$ has now been described. As described in the following embodiments, keeping a node that differs greatly in performance from other ferry terminals out of operation and leaving clusters in the hands of other ferry terminals do not make a great difference.

This invention is described next through embodiments.

In the embodiments, a random initial arrangement was set and, for each segment, whether or not a ferry that is assigned the segment reassigns clusters favorably through autonomous decentralized control with the use of an evaluation function that is a convex function was verified in order to confirm the effectiveness of this invention.

Figure 8:
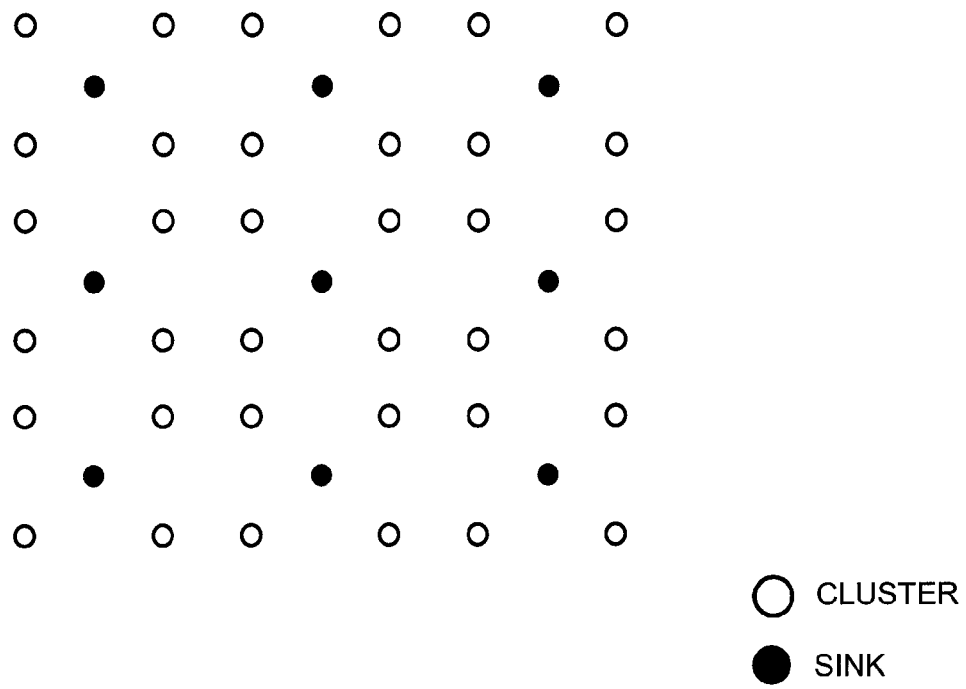
FIG. 8 is a diagram illustrating the arrangement of clusters and sinks that was used in operation verification in an embodiment of this invention.

FIG. 8 illustrates segment assignment in the arrangement of sinks and clusters that was used in the verification. Black circles represent sinks and white circles represent clusters. There are nine sinks and corresponding nine ferry DTN terminals are provided. The nodes in FIG. 8 are dispersed so that each node is in its optimum segment, for easier grasp of the result, and are arranged so that four clusters belong to each individual segment.

The concept behind the verification is that, if proper segment assignment (cluster assignment) is accomplished starting from a random initial arrangement, this invention can accomplish proper autonomous decentralized segment assignment also from various initial states that are found in practical application.

Figure 9:
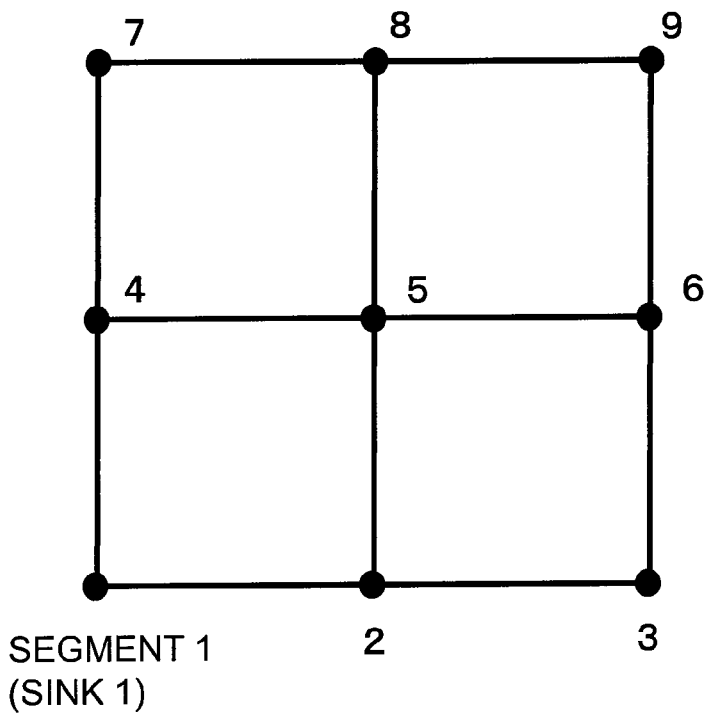
FIG. 9 is a conceptual diagram illustrating the structure of a network of segments that was used in the operation verification in the embodiment.

The adjacency relation between sinks (segments) in the embodiments has a network structure illustrated in FIG. 9. Sinks linked to each other by a line in FIG. 9 have an adjacency relation. In other words, ferries operate so as to travel back and forth only between sinks that are linked by a line in FIG. 9. Numerical characters in FIG. 9 represent the serial numbers of sinks (segments).

First Embodiment

Figure 10:
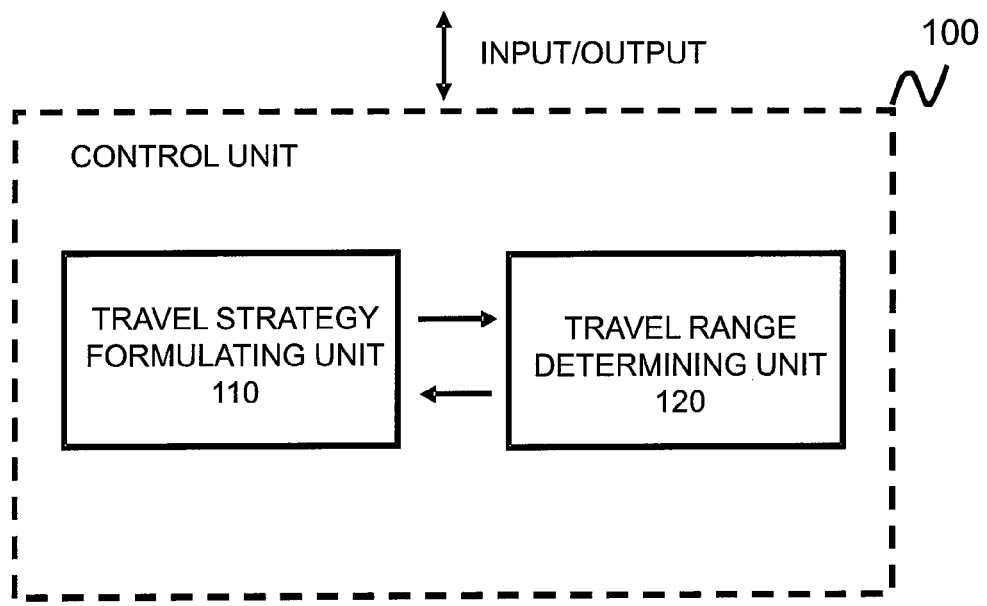
FIG. 10 is a block diagram of a control unit according to the embodiment.

In each ferry DTN terminal, a control unit 100 illustrated in FIG. 10 is installed along with communication means, storing means, delay tolerant communication means, and others. The control unit 100 may double as the delay tolerant communication means. The control unit 100 includes a travel strategy formulating unit 110 to determines a travel policy (schedule) for exchanging information with the sink in the segment and sinks in an adjacent segments, and a travel range determining unit 120 to splits segment ranges assigned to information transfer devices (assigned clusters) between its own ferry DTN terminal and other ferry DTN terminals to determine a range assigned to its own ferry DTN terminal through a planarization search processing in which a value is evened out between its own ferry DTN terminal and other ferry DTN terminals. In the case where the ferry DTN terminal travels autonomously, the travel strategy formulating unit 110 controls the travel means.

In this embodiment, a travel strategy algorithm for sequentially traveling back and forth between assigned clusters and a sink was installed in the travel strategy formulating unit 110, which is installed in each ferry DTN terminal. Specifically, a ferry DTN terminal returns to a sink once for each visit to one of its assigned clusters in order to pool information in the sink, and, after gathering information of all assigned clusters in the sink, visits all sinks of segments adjacent to itself.

A series of operations related to a surroundings search and an exchange of notification information and environment information with an adjacent segment is regarded as one turn of operations in this embodiment. After this series of operations is executed, the travel range determining unit 120 of each node individually updates the affiliation relations of clusters (changes the segment ranges) with the use of cluster arrangement information of adjacent segments which is obtained from the adjacent segments as environment information, and values calculated from evaluation functions. The method described in the embodiment mode was used as an algorithm of the travel range determining unit 110. Specifically, each individual control unit 100 executes the sequence of FIG. 5 as the need arises. The turn is subsequently repeated in cycles, to thereby gradually accomplish optimum segment assignment in an autonomous decentralized manner.

An evaluation function that can be used in the travel range determining unit 120 is described below.

A difference in total travel distance or total travel time between segments can be used as an index important for segment assignment as described above. An evaluation function for the verification therefore takes on the axis of abscissa a total travel distance necessary for one turn of circuiting of clusters in each segment (an assigned range of a ferry DTN terminal).

The travel strategy for traveling within a segment here employs a behavior model in which a ferry DTN terminal travels back and forth between a sink and clusters. Accordingly, when a travel distance between a sink i and a cluster j in one segment is given as $D_{ij}$, a total travel distance necessary for one turn of circuiting is $\lambda_i$, which is expressed by the following expression. In this embodiment, $\lambda_i$ is set as an evaluation function used in the control unit 100.

$$\lambda_i = \sum_j D_{ij} \qquad (4)$$

The following idea is applied to the axis of ordinate:

The travel distance per unit time of each ferry DTN terminal can be regarded as processing performance for collecting and delivering notification information. For example, a travel distance that a ferry DTN terminal is capable of covering in one day can be paraphrased as information collection processing performance per day of the ferry DTN terminal. Elements related to the travel distance (the road environment and the like) are desirably reflected by way of a function or the like.

A ferry DTN terminal that is high in information collection processing performance can collect more pieces of cluster information in one day than other ferry DTN terminals if the distance between a cluster and a sink is similar anywhere. A ferry DTN terminal can therefore be assigned more clusters when its processing performance is higher. The cluster-sink distance varies in practice, and each cluster-sink distance is reflected on a calculation for actually deriving cluster assignment.

A theory of an evaluation function used in the load balancing is described below.

Based on the queueing theory, when load arrives in Poisson distribution on an average of $\lambda_i$ per unit time and the load can be processed in Poisson distribution on an average of $\mu_{max}$ per unit time (an M/M/1 queue), a condition for minimizing the overall response of the system is expressed as follows:

$$\frac{\mu_{max} - \lambda_i}{\sqrt{\mu_{max}}} = const \quad (5)$$

The left side of Expression (5) is the linear function of a load volume $\lambda_i$, and, when integrated by $\lambda_i$, yields a quadratic function of $\lambda_i$. Because it is a known fact that a quadratic function is a convex function, if the function obtained by integrating the left side of Expression (5) is regarded as an evaluation function of each node, Expression (5) means that the response is minimum when differential values of the evaluation functions which are convex functions are equalized among the nodes.

Specifically, if the function obtained by integrating the left side of Expression (5) by $\lambda_i$ is set as an evaluation function of each node, and each node executes autonomous decentralized control with the use of this convex function, the overall response of the system can be minimized in a steady state. The value $\mu_{max}$ is a parameter related to processing performance, and can be used to describe the processing performance of a node. It is therefore not necessary for every node to have the same performance, and autonomous decentralized control can be executed also in a system where nodes of varying performance are mixed.

When the left side of Expression (5) is integrated by $\lambda_i$, the degree of freedom of the constant makes the solution that much more indeterminate. Accordingly, a convex function that runs through the origin (0, 0) is set here as the evaluation function of each node. The evaluation function is a quadratic function that is determined uniquely by $\mu_{max}$, has a peak value of $\mu_{max}^{1.5}/2$, and has a peak point ($\mu_{max}$, 0).

Figure 11:
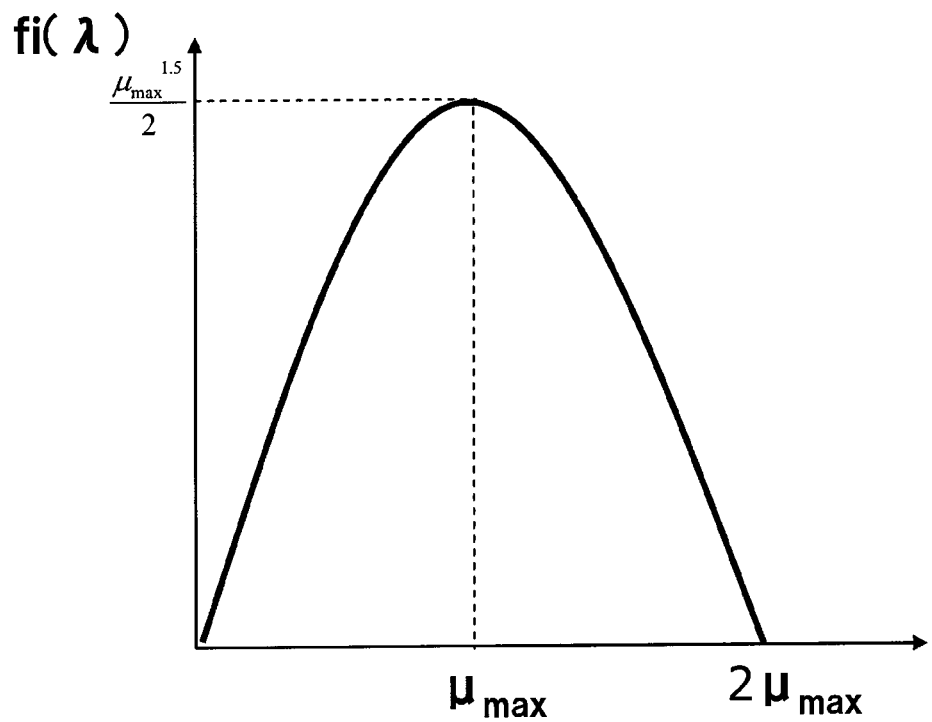
FIG. 11 is a graph showing an evaluation function that is set in the control unit according to the embodiment.

A convex function shown in FIG. 11 is the evaluation function set to each ferry DTN terminal. As in the description given above, a distance that can be covered by each ferry DTN terminal by one day of traveling is set as $\mu_{max}$. The value set as $\mu_{max}$ in this embodiment is uniform in order to check the basic operation. Control for equalizing differential values of the evaluation functions in this case is, because the evaluation functions all have the same form, control for equalizing the total travel distance for every segment.

Figure 12:
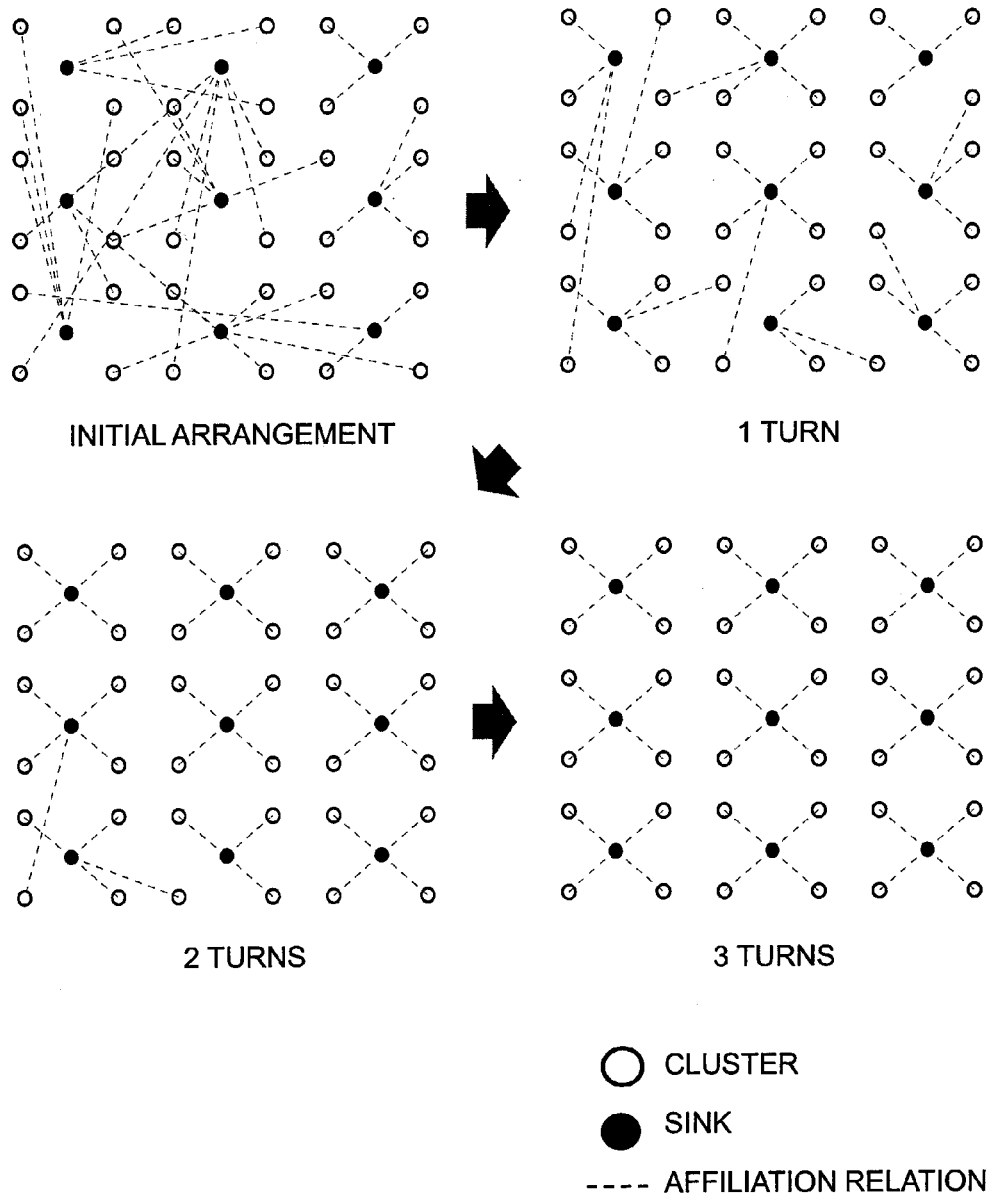
FIG. 12 is an explanatory diagram illustrating segment assignment operation verification in the embodiment.

FIG. 12 illustrates the verification result of segment assignment operation in the control method of this invention. Dotted lines connecting a sink to clusters represent affiliation relations, and indicate an assigned range.

As is clear from an illustrated shift for each turn, the affiliation relations changed sequentially toward a balance and optimum segment assignment. As a result, the initial state changed to optimum segment assignment in three turns.

An examination on transfer delay of notification information in the optimized segment assignment revealed that the length of transfer delay in the optimized state is about a fraction of that in the initial state.

When a cluster is added in an arbitrary location in the optimized state, the cluster is absorbed in a surrounding assigned range and then the impact of the addition of the cluster spreads throughout the network.

This embodiment thus proven through simulation analysis that assigned segments of the respective ferry DTN terminals can be optimized in an autonomous decentralized manner. This assures that the method is useful as a new way of building a delay tolerant network in an autonomous decentralized manner (in a self-organizing manner) even in an environment where information from all parts of an area afflicted by a catastrophe cannot be obtained in a centralized manner.

Second Embodiment

This embodiment deals with verification about the behavior of ferry DTN terminals that do not have the same traveling performance and differ from one another in traveling performance. The ferry DTN terminals have the same configuration as the one described in the first embodiment, but use evaluation functions set differently from the first embodiment.

The arrangement of sinks and clusters of FIG. 8 was used in this embodiment as in the first embodiment. In this embodiment, the traveling performance of a ferry DTN terminal of a segment 2 was set twice higher than that of other terminals. An evaluation function used in this embodiment has the convex form of FIG. 11 as in the first embodiment, but $\mu_{max}$ of an evaluation function set to the ferry DTN terminal that was assigned the segment 2 was set to a value twice larger than that of other terminals. This balances the network with the segment 2 being assigned more clusters than other segments.

Figure 13:
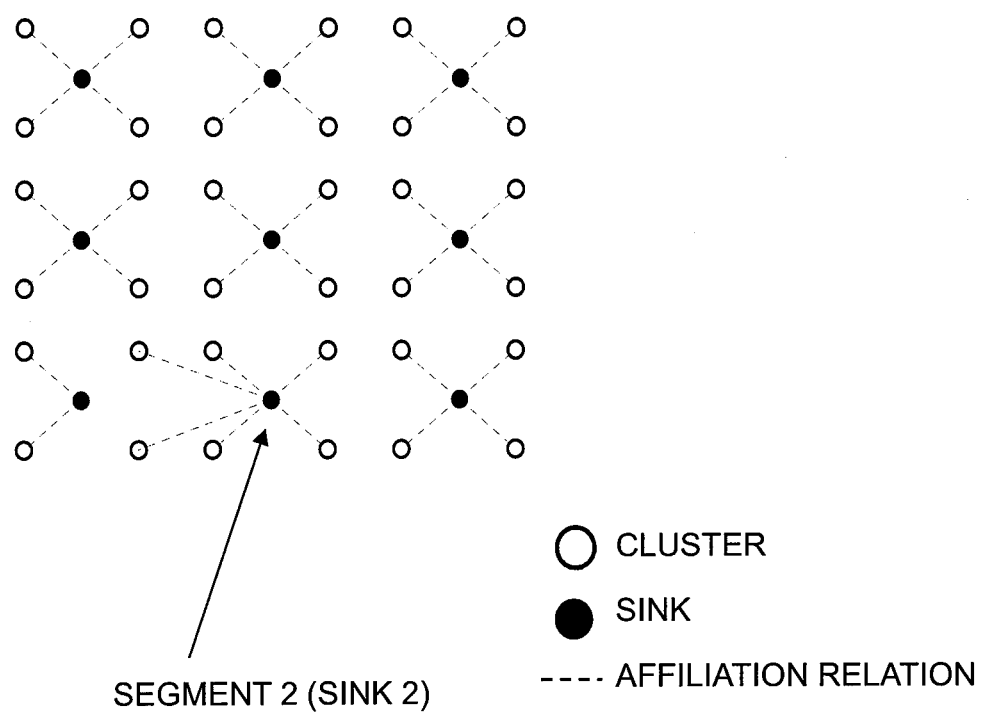
FIG. 13 is an arrangement diagram illustrating the result of segment assignment operation verification in another embodiment of this invention.

FIG. 13 illustrates the result of final operation in this embodiment. The same initial arrangement as in the first embodiment was used in a state where the initial values were set. While FIG. 13 illustrates only the final state where control has completed, the segment 2 ultimately acquired two more clusters as its assigned clusters. An examination on transfer delay of notification information in this final state revealed that the transfer delay was improved by approximately 10% from the transfer delay in the final segment assignment of the first embodiment.

It is understood from this result that the processing performance improvement made by setting twice higher processing performance to the ferry DTN terminal that was assigned the segment 2 spread throughout the network.

In other words, it was confirmed that, when ferry DTN terminals differ from one another in traveling performance, segment assignment that takes into account the traveling performance of the ferry DTN terminals is more effective in cutting short the overall transmission delay of the network than accomplishing a balance in which the travel distance or the travel time is equalized among segments.

This embodiment thus proven through simulation analysis that the method of this invention which optimizes assigned segments of the respective ferry DTN terminals in an autonomous decentralized manner influences the network appropriately based on the performance of each terminal. In other words, this invention proven that favorable segment assignment that takes into account the traveling performance of ferry DTN terminals is possible. This assures that the method is useful as a new way of building a delay tolerant network in an autonomous decentralized manner (in a self-organizing manner) even in an environment where the actual traveling performance of ferry DTN terminals in afflicted areas is not uniform.

Other Embodiment Modes of the Invention

In the first embodiment and the second embodiment, the convex function of FIG. 11, which is equivalent to a load balancing evaluation function based on server processing performance, is set as an evaluation function of a ferry DTN terminal. Other evaluation functions than this can be set in this invention, and the planarization processing may use evaluation functions that are created from, for example, the following viewpoints:

In a catastrophe, there is a case where setting a travel distance that suits the quantity of gasoline left of a car is advisable. An evaluation function that associates the quantity of gasoline and the traveling performance may be set in this case. In other cases, a segment that desires frequent communication to/from neighboring clusters may nevertheless have a particular request such as a request for exemption from sharing cost (load) that is assigned to an arbitrary or given other segment. In such a situation, the segment can be spared from sharing a cost (load) that is assigned to another segment by taking measures such as intentionally making the absolute value of the evaluation function of the segment smaller than the absolute value of the evaluation function of the other segment, or masking the segment from control (excluding from among subjects of control of this invention). This invention thus allows for setting an evaluation function quantitatively and qualitatively in a manner that fits the situation on the site, as the need arises, even after the fact, and an overall network that fits the situations on the individual sites can accordingly be formed through sequential optimization.

The information transmission method of this invention is capable of achieving an overall balance through autonomous decentralized operation based on pieces of environment information that are kept by local individual terminals, even when environment information from all parts of an area where a delay tolerant network is built cannot be obtained. In the case where the range of a disaster is small and environment information from all parts of the range can be obtained, on the other hand, the balancing processing computation of this invention may be performed in a central node after the pieces of environment information are collected. The result of the computation is then installed in each node. This installation may be implemented by propagating the result as environment information of the delay tolerant network, or by other methods. The installation can also be used to give new evaluation functions at once to the respective nodes operating in an autonomous decentralized manner. It is desirable in this case to switch evaluation functions of all nodes at once by writing a time for the switch in the environment information to be propagated.

Components of each information transfer device can be implemented by a combination of hardware and software. In the mode where the components are a combination of hardware and software, the components are implemented as the various means by deploying a program for this delay tolerant communication method in a RAM and causing the control unit (CPU) and other pieces of hardware to operate as programmed by the program. The program may be recorded fixedly in a recording medium to be distributed. The program recorded in the recording medium is read onto a memory via cable communication, wireless communication, or the recording medium itself, and runs the control unit and others. Examples of the recording medium include optical discs, magnetic disks, semiconductor memory devices, and hard disks.

To rephrase the embodiment mode described above, the information transfer device forming a part of a delay tolerant network can be implemented by running the control unit as control means for deriving an assigned range and travel strategy formulating means as programmed by a program for this delay tolerant communication method deployed in a RAM. The program may include an algorithm for running other components such as communication means.

The block configuration in the embodiment modes and the embodiments is merely an example, and modifications such as separation/incorporation and the switching of steps can be made freely as long as the spirit of this invention and the described functions are fulfilled, and a description given below is not to limit this invention.

As described above, the information transfer device to which this invention is applied makes it possible to provide the delay tolerant network in which the assigned ranges of respective information transfer devices are optimized in real time in a manner that fits the situation on the site, thereby optimizing the transmission delay throughout the whole range in real time.

In other words, this invention is capable of providing the delay tolerant network and the information transmission method which relate to the delay tolerant communication method and which optimize assigned ranges of respective information transfer devices in real time in a manner that fits the situation on the site, thereby optimizing the transmission delay throughout the whole range in real time. This invention also provides the information transfer device and program for building the delay tolerant network.

Consequently, this invention enables shelters to share various types of information speedily immediately after a great earthquake, and increases the chance for a quick amelioration of "information vacuum".

With this invention, when a delay tolerant network is run in a situation where existing networks do not function, such as a catastrophe, information transmission in the area can be sped up by effectively utilizing information transfer terminals that are capable of temporarily storing information. The information transfer terminals each operate so that the delay tolerant network can be built with the use of only environment information that is obtained from its immediate surrounding information terminals, thereby advancing overall optimization with efficiency.

The disaster resistance of an information communication network can be enhanced more by making preparations for the building of the delay tolerant network according to this invention, in addition to reinforcing existing network infrastructure.

This application claims priority based on Japanese Patent Application No. 2013-050770, filed on Mar. 13, 2013, the entire disclosure of which is incorporated herein.

REFERENCE SIGNS LIST 100 control unit (control means: transmission delay minimization processing means)
110 travel strategy formulating unit (travel strategy formulating means)
120 travel range determining unit (travel range determining means)

The invention claimed is:

1. An information transfer device, comprising:
a communication unit to communicate to and from another device within a communication range that is connected to the information transfer device;
a storing unit to store and keep notification information that is received via the communication unit to be relayed;
a delay tolerant communication unit to exchange the notification information stored in the storing unit with another device when the exchange becomes possible; and
a control unit to exchange environment information with another information transfer device, and to derive an assigned range that is assigned autonomously to the information transfer device, based on the environment information that is kept by the information transfer device, through a planarization search processing in which a value is evened out between the information transfer device and other information transfer devices, the value being a value of equal load balancing another one of the information transfer devices, the assigned range being one of ranges that are shared between the information transfer device and the other information transfer devices as assigned ranges.

2. The information transfer device according to claim 1, wherein the control unit derives the assigned range by determining the assigned range that is assigned to the information transfer device, using as a parameter a cost necessary to connect arbitrary devices in the assigned range of the information transfer device by delay tolerant communication, through the planarization search in which the cost is evened out between the information transfer device and the other information transfer devices through use of an evaluation function set to the information transfer device and evaluation functions set to the other information transfer devices.

3. The information transfer device according to claim 2, wherein, as the parameter indicating the cost, a total travel distance or a total travel time is used.

4. The information transfer device according to claim 2, wherein the control unit manages and keeps only the evaluation function of the information transfer device, and adjusts the assigned range with respect to each other, calculates from the managed and kept evaluation function a value to be compared which is used in the planarization search processing, notifies the value to another information transfer device, receives from the other information transfer device a value calculated from the evaluation function that is managed by the other information transfer device, and determines the assigned range of the information transfer device so that the values are evened out.

5. The information transfer device according to claim 2, wherein the control unit receives the evaluation function from an adjacent information transfer device, and adjusts the assigned range with respect to each other, determines the assigned range of the information transfer device so that a value calculated through use of the evaluation function of the information transfer device and a value calculated through use of the received evaluation function are evened out.

6. The information transfer device according to claim 2, wherein the control unit adjusts the assigned range in a manner that equalizes values derived from the evaluation functions of each other, and cooperates with another information transfer device so that each information transfer device obtains a value derived from the evaluation function of the respective information transfer device.

7. The information transfer device according to claim 1, wherein the control unit executes processing of formulating, as a travel strategy, a route that accumulates the notification information in a given device which is within the assigned range of the information transfer device after obtaining and keeping through an information exchange for notification information that is collected in the assigned range of the other information transfer device.

8. The information transfer device according to claim 7, wherein the control unit identifies a location of an arbitrary device by receiving environment information about the assigned range of the other information transfer device, and executes an adding process in which the arbitrary device is added to the assigned range of the information transfer device, when a travel distance or travel time based on a positional relation between the information transfer device and the arbitrary device is smaller than a travel distance or travel time which is assigned the arbitrary device at the other information transfer device.

9. The information transfer device according to claim 1, wherein the control unit executes processing of formulating, as a travel strategy, a route that is used to travel at given intervals to a communication range of a given device where another information transfer device accumulates notification information and environment information, and obtains the notification information collected by the other information transfer device.

10. The information transfer device according to claim 1, wherein the control unit derives the assigned range of the information transfer device, based on the environment information that is kept by the information transfer device and based on a result of equalizing costs of each other through use of an evaluation function built from a convex function.

11. The information transfer device according to claim 10, wherein the control unit comprises an algorithm for equalizing differential values of the convex function of each other, and uses the algorithm to execute the equalizing of the costs.

12. The information transfer device according to claim 11, wherein the control unit operates with a performance difference between the information transfer device and the other information transfer devices reflected on a set value as a difference between maximum values of each convex function.

13. A delay tolerant network, comprising:
a plurality of information transfer devices each of which executes delay tolerant communication by using a communication unit to communicate to and from another device within a communication range that is connected to the information transfer device and a storing unit to store and keep collected notification information to exchange the collected and kept notification information with another device when the exchange becomes possible, each of the plurality of information transfer devices comprising
a control unit to exchange environment information with another information transfer device, and to derive an assigned range that is assigned autonomously to the respective information transfer device, based on the environment information that is kept by the respective information transfer device, through a planarization search processing in which a value is evened out between the respective information transfer device and other information transfer devices, the value being a value of equal load balancing another one of the information transfer devices, the assigned range being one of ranges that are shared between the respective information transfer device and the other information transfer devices as assigned ranges, wherein each of the plurality of information transfer devices collects and deploys notification information while operating in an autonomous decentralized manner.

14. The delay tolerant network according to claim 13, further comprising a central node to collect environment information in a concentrated manner from the plurality of information transfer devices for executing delay tolerant communication, and to execute, through use of the concentrated environment information, computing processing of a result that is obtained through the planarization search processing in which the value is evened out among the plurality of information transfer devices to determine the assigned ranges of the plurality of information transfer devices, wherein the assigned ranges determined through the computing processing are notified to the plurality of information transfer devices.

15. A method of transmitting information in a delay tolerant network, comprising:

building the delay tolerant network, by exchanging between a plurality of information transfer devices that collected and kept notification information when the exchange becomes possible, each of the plurality of information transfer devices comprising a communication unit to communicate to and from another device within a communication range that is connected to the information transfer device and a storing unit to store and keep collected notification information; and operating a delay tolerant communication processing, by each of the plurality of information transfer devices, when collecting and deploying notification information by repeating in an autonomous decentralized manner, the delay tolerant communication processing, by each of the plurality of information transfer devices comprising:

an operation of exchanging environment information with another one of the information transfer devices, and a processing operation for deriving an assigned range that is autonomously assigned to the respective information transfer device, based on the environment information kept by the respective information transfer device, through a planarization search processing in which a value is evened out between the respective information transfer device and other information transfer devices, the value being a value of equal load balancing another one of the information transfer devices, the assigned range being one of ranges that are shared between the respective information transfer device and the other information transfer devices as assigned ranges.

16. The method of transmitting information according to claim 15, further comprising, by each of the plurality of information transfer devices, deriving by determining the assigned range that is assigned to the respective information transfer device, using as a parameter a cost necessary to connect arbitrary devices in the assigned range of the respective information transfer device by delay tolerant communication, through the planarization search in which the cost is evened out between the respective information transfer device and the other information transfer devices through use of an evaluation function set to the respective information transfer device and evaluation functions set to the other information transfer devices.

17. The method of transmitting information according to claim 16, further comprising:

repeating, as necessary, in an autonomous decentralized manner, by each of the plurality of information transfer devices, processing of managing and keeping only the evaluation function of the respective information transfer device, calculating from the managed and kept evaluation function a value to be compared which is used in the planarization search processing, notifying the value to another one of the information transfer devices, and processing of receiving from the other information transfer device a value calculated from the evaluation function that is managed by the other information transfer device;

determining, by each of the plurality of information transfer devices, the assigned range of the respective information transfer device so that the values calculated from the evaluation functions are evened out; and adjusting, by each of the plurality of information transfer devices, the assigned range of the respective information transfer device while the other information transfer device adjusts the assigned range of the other information transfer device.

18. The method of transmitting information according to claim 16, further comprising:

adjusting, by each of the plurality of information transfer devices, the assigned range in a manner that equalizes values derived from the evaluation functions of each other, to cooperate with another one of the information transfer devices so that each of the plurality of information transfer devices obtains a value derived from the evaluation function of the respective information transfer device.

19. The method of transmitting information according to claim 15, further comprising executing, by each of the plurality of information transfer devices, processing of formulating, as a travel strategy, a route that accumulates the notification information in a given device which is within the assigned range of the respective information transfer device after obtaining and keeping through an information exchange for notification information that is collected in the assigned range of the other information transfer device.

20. The method of transmitting information according to claim 15, further comprising executing, by each of the plurality of information transfer devices, processing of formulating, as a travel strategy, a route that is used to travel, at given intervals to a communication range of a given device where another information transfer device accumulates notification information and environment information, and obtaining the notification information collected by the other information transfer device.

21. The method of transmitting information according to claim 15, further comprising identifying, by each of the plurality of information transfer devices, a location of an arbitrary device by receiving environment information about the assigned range of an adjacent information transfer device, and executes an adding process in which the arbitrary device is added to the assigned range of the respective information transfer device, when a travel distance or travel time based on a positional relation between the respective information transfer device and the arbitrary device is smaller than a travel distance or travel time which is assigned the arbitrary device at the other information transfer device.

22. The method of transmitting information according to claim 15, further comprising executing, by each of the plurality of information transfer devices, the deriving the assigned range, based on the environment information that is kept by the respective information transfer device and based on a result of equalizing costs of each other through use of an evaluation function built from a convex function.

23. The method of transmitting information according to claim 22, further comprising causing each of the plurality of information transfer devices to operate with a performance difference between the respective information transfer device and other information transfer devices reflected on a set value as a difference between maximum values of each convex function.

24. A non-transitory computer-readable recording medium having recorded thereon a program for controlling a control unit of an information transfer device for delay tolerant communication, so that the control unit, to exchange environment information with another information transfer device, and to derive an assigned range that is assigned autonomously to the information transfer device, based on the environment information that is kept by the information transfer device, through a planarization search processing of each other in which a value of equal load balances another information transfer device, the assigned range being one of ranges that are shared between the information transfer device and the other information transfer device.

25. The recording medium having the program recorded thereon according to claim 24, wherein the program controls the control unit so that the control unit executes deriving by determining the assigned range that is assigned to the information transfer device, using as a parameter a cost necessary to connect arbitrary devices in the assigned range of the information transfer device by delay tolerant communication, through the planarization search in which the cost is evened out between the information transfer device and the other information transfer devices through use of an evaluation function set to the information transfer device and evaluation functions set to the other information transfer devices.

26. The recording medium having the program recorded thereon according to claim 25, wherein, as the parameter indicating the cost, a total travel distance or a total travel time is used.

27. The recording medium having the program recorded thereon according to claim 26, wherein the program controls the control unit so that operation of the control unit comprises:
adjusting the assigned range with respect to each other, by determining the assigned range of the information transfer device so that the values calculated from the respective evaluation functions are evened out, the adjusting including:
repeating, as necessary, processing of calculating, from the evaluation value of the information transfer device, a value to be compared which is used in the planarization search processing, to notify the value to another one of the information transfer devices, and processing of receiving, from the other information transfer device, a value calculated from the evaluation function that is managed by the other information transfer device.

28. The recording medium having the program recorded thereon according to claim 24, wherein the program controls the control unit so that operation of the control unit comprises:
identifying a location of an arbitrary device by receiving environment information about the assigned range of an adjacent information transfer device; and
executing adding processing in which the arbitrary device is added to the assigned range of the information transfer device, when a travel distance or travel time based on a positional relation between the given device and the arbitrary device is smaller than a travel distance or travel time which is assigned the arbitrary device at the other information transfer device.

29. The recording medium having the program recorded thereon according to claim 24, wherein the program controls the control unit so that the control unit executes the deriving the assigned range of the information transfer device, based on the environment information that is kept by the information transfer device and based on a result of equalizing costs of each other through use of an evaluation function built from a convex function.

30. The recording medium having the program recorded thereon according to claim 24,
wherein the program comprises an algorithm for equalizing differential values of the convex function of each other, and
wherein the program controls the control unit so that the control unit uses the algorithm to execute the equalizing of the costs with a performance difference between the information transfer device and other information transfer devices reflected on a set value as a difference between maximum values of each convex function.

* * * * *